Sept. 19, 1933.　　　　H. G. MUELLER　　　　1,927,527
VALVE GEAR
Original Filed Oct. 13, 1928　　　6 Sheets-Sheet 2
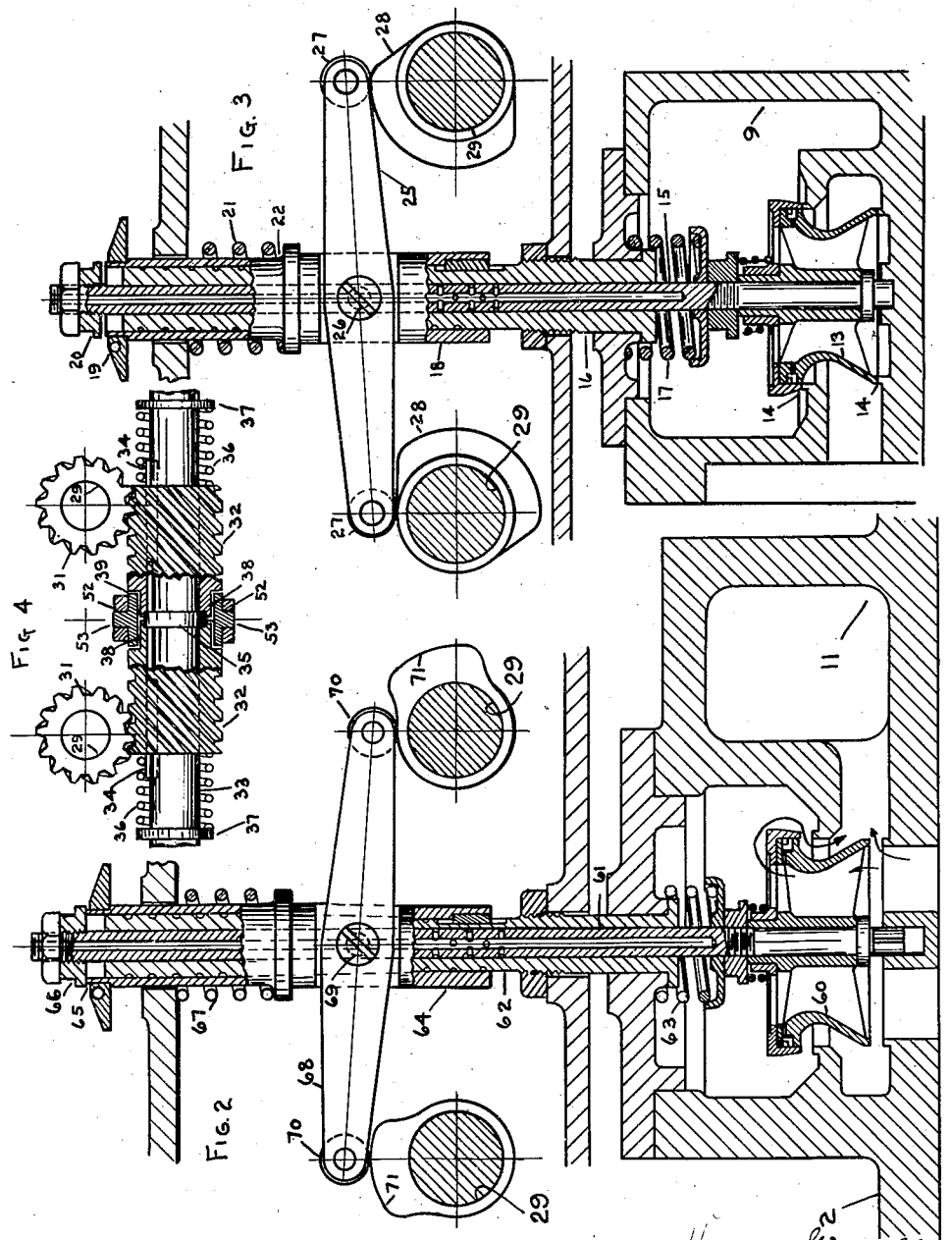

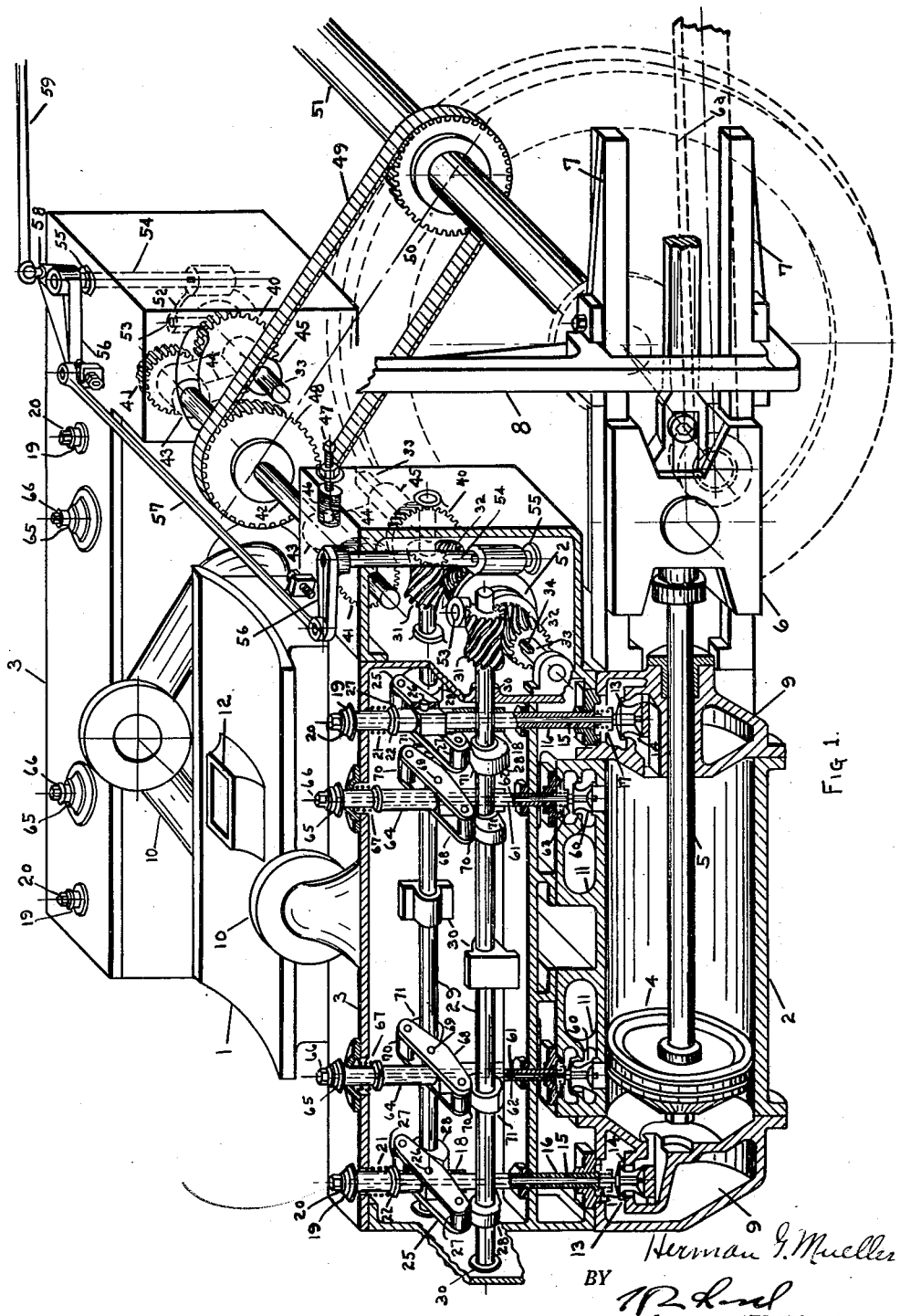

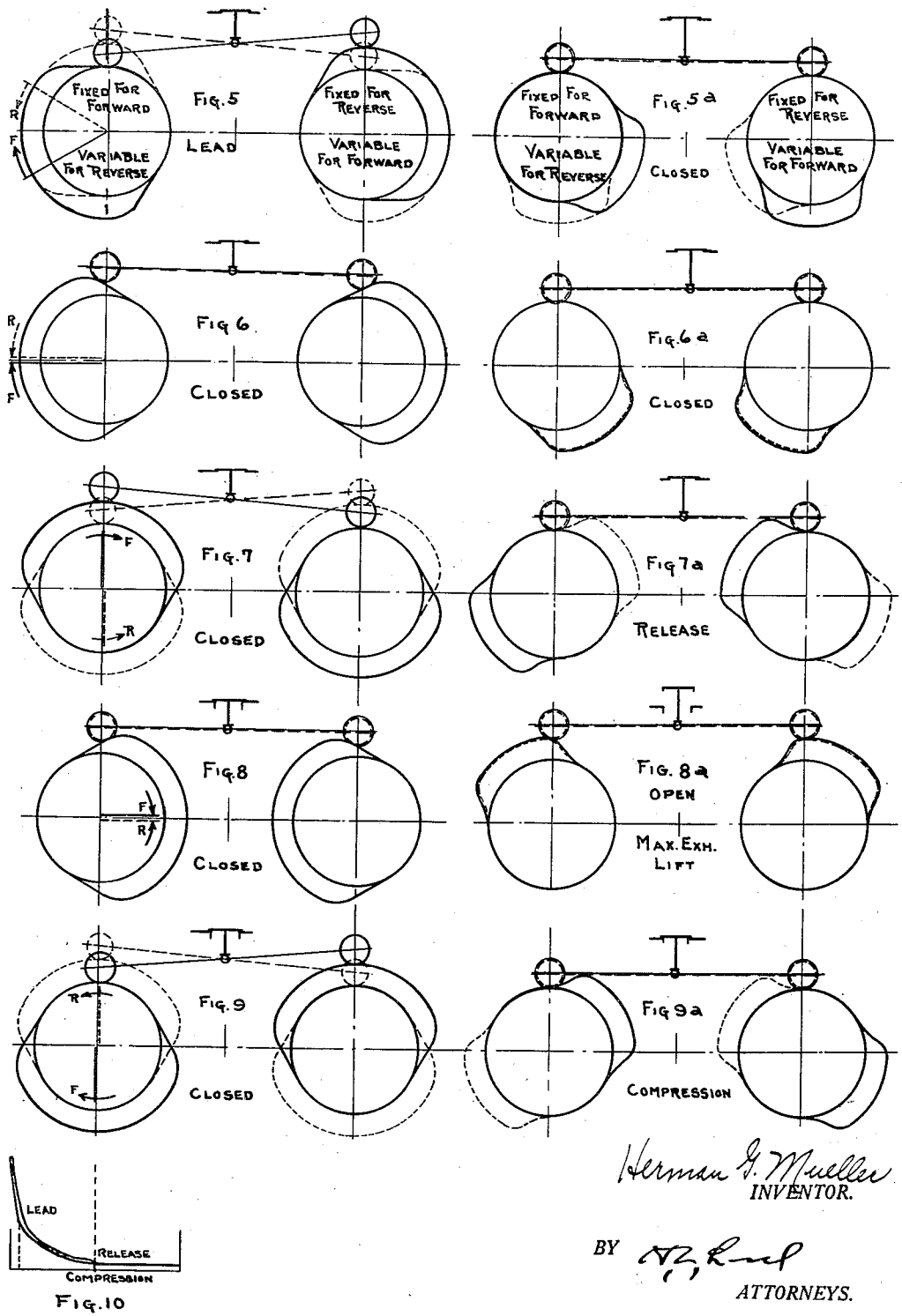

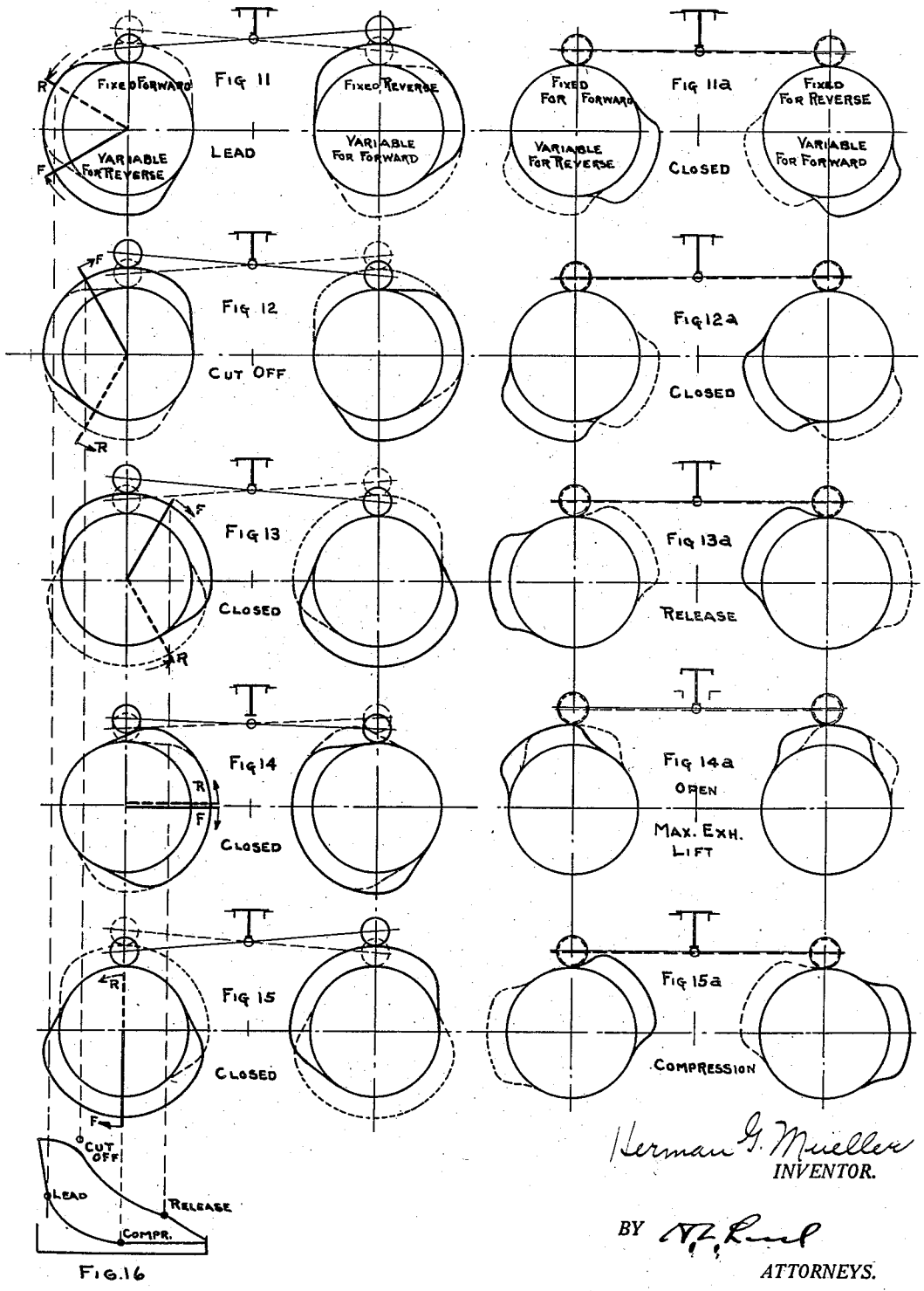

Sept. 19, 1933.  H. G. MUELLER  1,927,527
VALVE GEAR
Original Filed Oct. 13, 1928  6 Sheets-Sheet 5
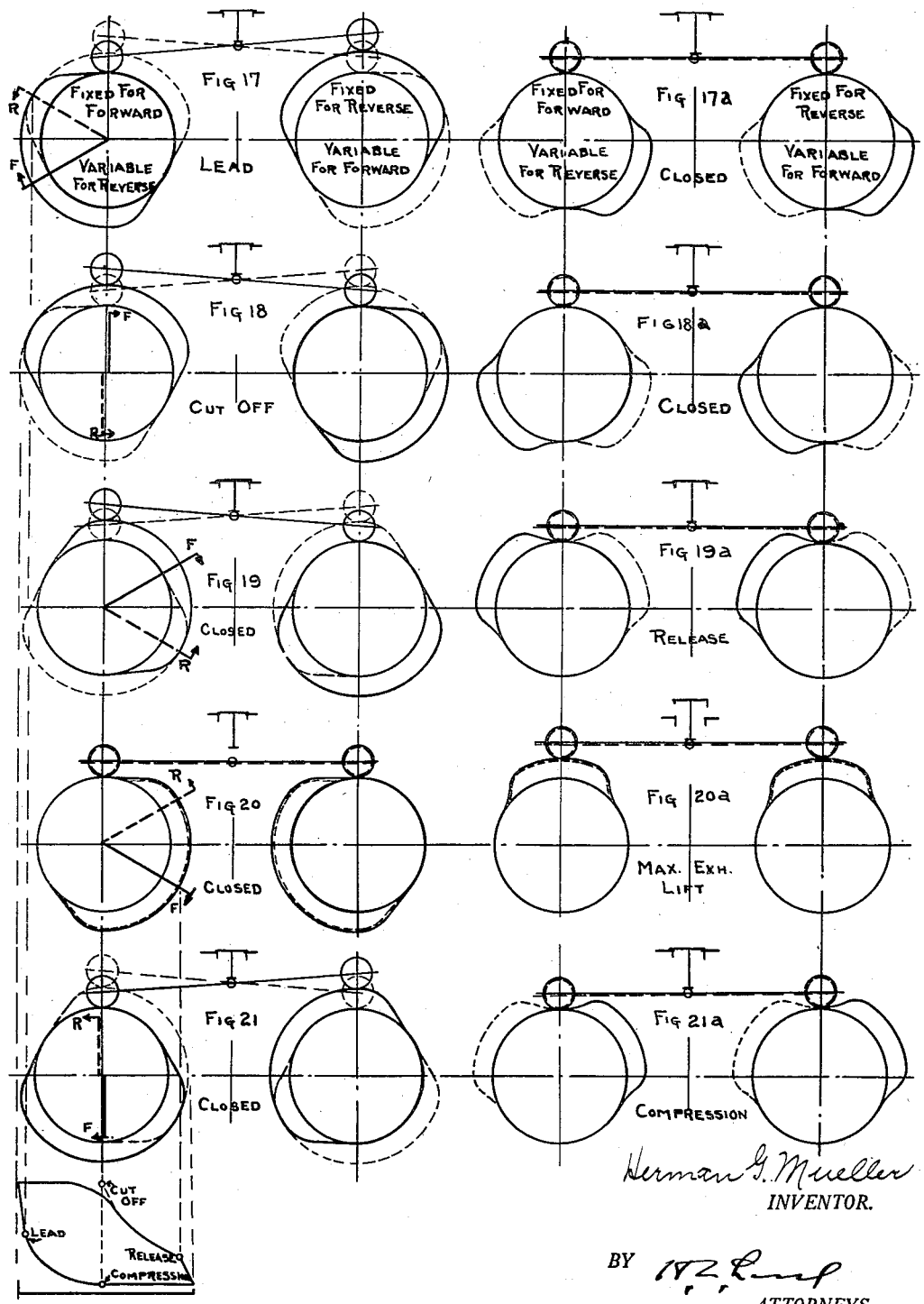

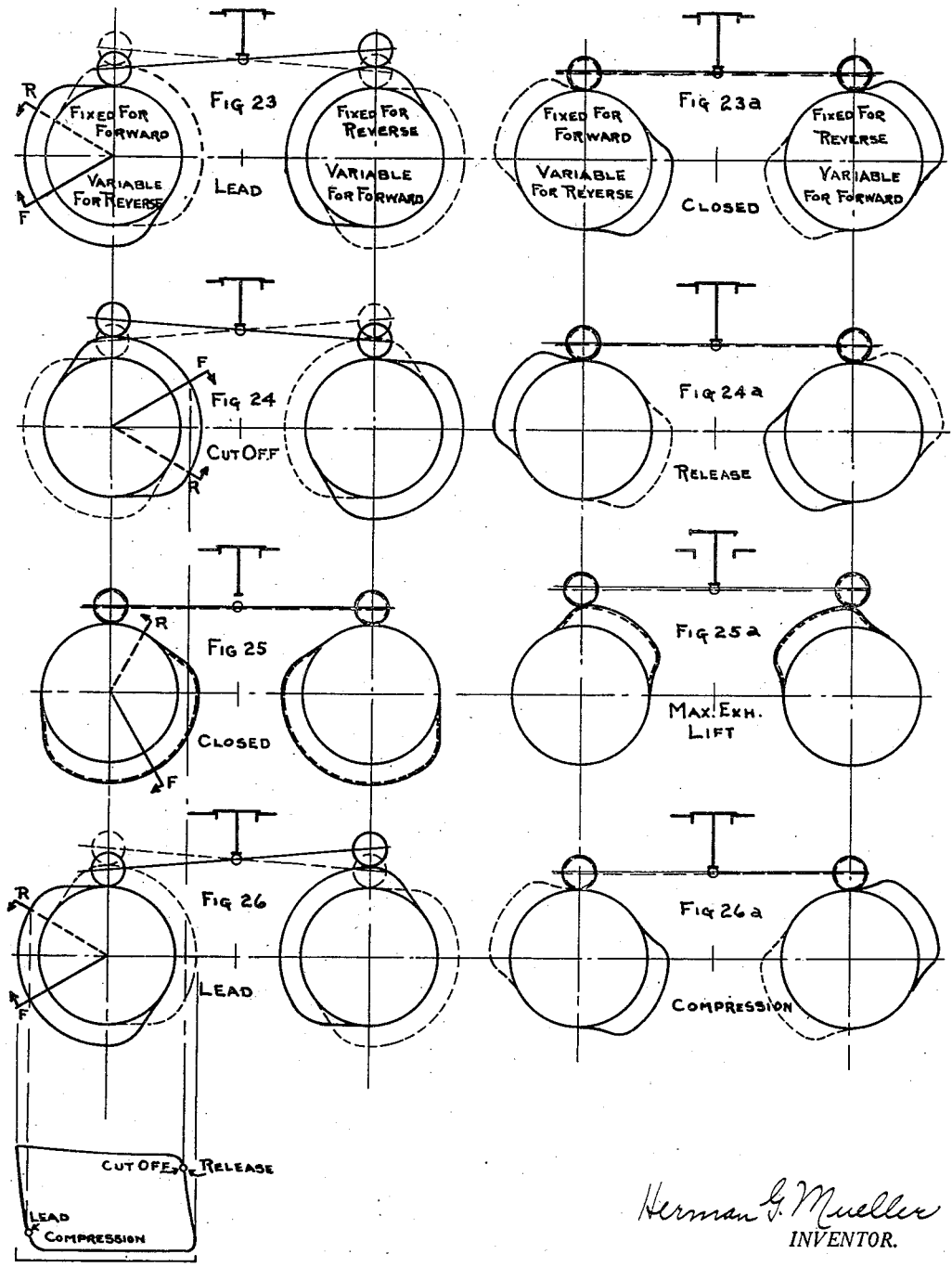

Patented Sept. 19, 1933

1,927,527

UNITED STATES PATENT OFFICE 1,927,527

VALVE GEAR

Herman G. Mueller, Erie, Pa., assignor to Skinner Engine Company, Erie, Pa., a corporation of Pennsylvania Application October 13, 1928, Serial No. 312,359
Renewed June 21, 1933

49 Claims. (Cl. 121—127)

The valve gear of the present invention is particularly advantageous in the handling of poppet valves. In my application, Serial Number 238,-435, filed Dec. 7th, 1927 I have illustrated and described a valve gear adapted to control the inlet valve of a uniflow engine and in my application, Serial Number 238,436, filed Dec. 7, 1927 I have provided this type of valve gear with reversing devices by means of which the engine may be readily reversed, the said valve gear being adapted and arranged more particularly for uniflow engines and providing no special exhaust valves. With very many situations exhaust valves are desirable. The present invention is designed to provide a valve gear involving mechanism suitable for exhaust valves. In carrying forward the invention these exhaust valves are of the cam actuated type and in the preferred form adapted to operate in connection with the cam actuated inlet valves disclosed in my previous application. In the broader aspects of the invention, the invention is capable of use with an ordinary variable cut-off engine but the engine has been advanced and designed to operate in connection with a reversing gear and as exemplified this reversing gear is applied to a locomotive and the valve settings are such as to take care of the special problems involved in locomotive handling. Features and details of the invention will appear from the specification and claims.

A preferred embodiment of the invention is illustrated in the accompanying drawings as follows:—

Fig. 1 shows a perspective view, partly in section, of a locomotive engine and valve gear operating parts.

Fig. 2 an enlarged section of one of the exhaust valves and its actuating mechanism.

Fig. 3 an enlarged section of one of the steam valves and its operative mechanism.

Fig. 4 a part of the reversing mechanism of the valve gear.

Figs. 5, 6, 7, 8 and 9 show diagrammatical views of the inlet valve controlling cams and valve connecting mechanism with the valve gear set at neutral.

Figs. 5a, 6a, 7a, 8a, and 9a similar views of the exhaust valve controlling cams and valve connecting mechanisms with the cam settings coinciding with Figs. 5, 6, 7, 8 and 9 of the inlet valves respectively.

Fig. 10 an indicator diagram following a gear setting of the cams in the preceding Figures 5—5a to 9—9a.

Figs. 11 to 15 show similar diagrammatical views of the inlet valve controlling cams and valve connections with the valve gears set to early cut-off.

Figs. 11a to 15a inclusive the exhaust valve controlling cams with a setting corresponding to the settings of the inlet cams in Figs. 11 to 15.

Fig. 16 an indicator diagram with the cam setting from Figs. 11—11a to Figs. 15—15a inclusive.

Figs. 17 to 21 show similar diagrammatical views of the inlet valve controlling cams and valve connections with the valve gear set to mid-cut-off.

Figs. 17a to 21a inclusive views of the valve exhaust controlling cams with the valve connections, the cams corresponding in point of rotation with Figs. 17 to 21 respectively.

Fig. 22 an indicator diagram formed with a setting of the valve gear in the preceding Figures 17—17a to 21—21a.

Figs. 23 to 26 inclusive show similar views of the inlet valve controlling cams and valve connections with the valve gear set to late cut-off.

Figs. 23a to 26a similar views of the exhaust valve controlling cams and connecting valves, the cams being positioned to correspond to the cam positions of Figs. 23 to 26 respectively.

Fig. 27 an indicator diagram with the valve gear setting as indicated in Figs. 23—23a to 26—26a.

1 marks the saddle of the locomotive to which is attached the engine cylinders 2. Valve gear chests 3 are arranged on the cylinders. Pistons 4 operate in the cylinders. Piston rods 5 extend to cross heads 6, the cross heads operating on guides 7, the guides being supported by an engine frame 8.

Steam chests 9 are arranged at the ends of the cylinders. These steam chests are connected to steam inlets 10 leading from the locomotive boiler (not shown). Exhaust ports 11 lead to an exhaust passage 12 which is carried through the saddle and to the smoke box of the locomotive (not shown). The inlet valve 13 is of the double poppet type. It operates on seats 14 and is provided with a stem 15. This stem extends through a guide sleeve 16. A spring 17 operates directly on the valve to close the same. A sleeve 18 is slidingly mounted on the sleeve 16 and terminates in a cap 19 which is adapted to engage a cap 20 on the valve stem. A spring 21 is arranged around the sleeve 18 and operates against a shoulder 22 and the top plate of the gear case. This tends to hold the sleeve 18 in the lower position. A rider lever 25 is connected by a pin 26 with the sleeve 18. Rollers 27 are arranged in the ends of the rider levers and these rollers operate on inlet valve controlling cams 28. The cams 28 are fixed on shafts 29. The shafts 29 are mounted in bearings 30 in the gear case. There are two sets of cams 28 and exactly similar inlet valve mechanisms at each end of the cylinder, the cam setting at one end of the cylinder being opposite to that of the other end of the cylinder to properly time the cams. Gears 31 are fixed on the ends of the shaft 29. These gears are of spiral form and mesh with gears 32. The gears 32 are slidingly mounted on a shaft 33 having a spline and groove connection with the shaft, the spline being indicated at 34, the spline and groove connection permitting the gears 32 to be moved axially on the shaft 33. A stop shoulder 35 is provided on the shaft 33 and between the gears 32, this shoulder forming a definite stop for these gears positioning them for the neutral position of the valve gears. Springs 36 are arranged between shoulders 37 on the shaft 33 and the outer ends of the gears 32. The inner ends of the gears 32 are slightly reduced at 38 and a ring 39 is placed in the groove thus formed.

By moving either of the gears 32 axially away from the shoulder 35 the gear 31 and consequently its cams can be retarded from the neutral position leaving the cams of the opposite shaft in fixed position and either of these gears 32 may be moved, one gear for the forward movement and the other gear for a reverse movement, the adjusted or variable cam in each instance determining the cut-off and the fixed cam determining the lead. It will be undertsood that this scheme of gearing, cams and shafts, is arranged in the gear chest for each cylinder. A gear 40 is fixed on the shaft 33 and meshes with a gear 41. The gear 41 is fixed on a shaft 42 which extends from one valve mechanism to the other. The shaft 42 is carried in bearings 43. These bearings are carried in rock arms 44, the lower ends of the rock arms being provided with bearings 45 rotatively mounted on the ends of the shafts 33. Springs 46 crowd the rock arms toward the front of the locomotive and these springs are adjusted by set screws 47.

A gear 48 is fixed on the shaft 42 and is driven by a chain 49. The chain 49 is driven from a gear 50 and the gear 50 is fixed on one of the locomotive axles 51 and is thus driven from the engine, the connecting rod 6a operating on a companion axle (not shown) which axle is connected by mechanism (not shown) with the axle 51 making this connection.

A fork 52 has its ends swiveled on trunnions 53. The fork is fixed on a rock shaft 54 and this rock shaft is carried in bearings 55 in the valve gear case. A rock arm 56 is fixed on the upper end of the rock shaft 54 and the rock arms 56 for each side of the locomotive are connected by a link 57. The rock arm 56 at one side has a bell crank extension 58 from which the control rod 59 of the locomotive extends. It will be seen, therefore, as the control rod 59 is operated the rock shafts 54 at each side of the locomotive are simultaneously operated, thus controlling both cylinders. It will readily be seen that through the action of the control rod the rock arm 58 is swung and with it the forks 52 so as to move one or the other of the gears 32 away from the shoulder 35 so as to advance the cut-off and control the movement of the engine in forward or reverse direction. Exhaust valves 60 of the double port type are arranged at each end of each cylinder. Each exhaust valve has a stem 61 which extends through a sleeve 62. Springs 63 tend to close the valve. A sleeve 64 is slidingly mounted on the sleeve 62 and has a head 65 operating on a head 66 on the stem 61 to lift the valve. A spring 67 tends to return the sleeve. A rider lever 68 is connected by a pin 69 with the sleeve 64. The lever is provided with rollers 70 which operate on exhaust cams 71 fixed on the shafts 29. In the operation of the inlet valves the lift of the valve is accomplished only when the high surfaces of both cams are brought under the rollers 25 but in connection with the exhaust cams the valve is opened when the high surface of either cam is brought under a roller and is given its maximum lift when both exhaust cams operate under the rollers.

In forming a cam mechanism of this type, particularly for exhaust valves which must be closed through a greater part of the stroke it would be difficult to form cams of the type used with the inlet valve that would accomplish the proper sequence of movements. This is particularly true if the effort is made to directly connect and fix the exhaust cams with the corresponding inlet cams. It is desirable to have a late release throughout the cut-off range of the valve and it is also desirable to have a variable compression point so that with a short cut-off with an ordinary correspondingly higher speed of the engine an earlier compression point may be established. This problem of such a cam hook-up is complicated where the same cams are used for reversal in that the advancing of the point of compression with the earlier cut-offs should proceed through the action of the same cams in both directions. This is accomplished in the present mechanism by making the compression and release points on the stroke coincident with the valve in neutral. This is possible because with a movement of the valve gear in either direction to establish a lead opening will also throw the variable exhaust cam so that the point of release will be sufficiently late to operate successfully with the early cut-off. In the present invention the ideal timing for both exhaust and inlet valves is accomplished with a direct and positive movement of the mechanisms without the introduction of lost motion devices to take care of variations in the timing incident to the reverse of the valve gear.

In order that this shaping and operation of the cams may be understood I have shown diagrammatically the various positions of the inlet with corresponding positions of the exhaust cams and corresponding positions of the valves at each of the critical points in the cycle of the engine. This is illustrated in Figs. 5 to 27a inclusive. In these diagrams I have shown the cams as located for a forward direction in solid lines and as shown for a reverse direction in dotted lines. I have indicated the position of the cranks utilizing the center of one of the inlet cams as a center for the crank, the position of the crank with a forward movement of the engine being indicated in solid lines and the position of the crank with the engine in reversed relation to the dotted cams in dotted lines. With a forward movement of the cam setting the valve controlling inlet cams at the left are fixed, that is to say, the gear 32 (see Fig. 4) at the left is against the shoulder 35 whereas the gear 32 at the right is moved to vary the cam at the right in these illustrative figures. In reverse, or as to the dotted cams exactly the reverse is true, that is to say the gear 32 at the right remains against the shoulder and the gear 32 at the left is moved to effect variations in the valve action. In each case, as in my former application, the fixed cam controls the lead point, or the opening point of the valve. This, as specifically shown in this application is actually fixed but may be slightly varied for purposes of lead, if desired, as indicated in my former application. The variable cam in each instance controls the point of cut-off. As the high surface of the cam at the left approaches its roller this will correspond to the lead point whereas the point at which the roller rides off the high surface of the cam to the right will indicate the point of cut-off.

In Fig. 5 the crank is at the ordinary lead point. It will be noted, however, that the roller on the variable cam is nearly off the high surface.

In Fig. 6 which represents this zero cut-off the roller on the variable cam at the right is passing off the high spot as the roller on the fixed cam is moving up to the high spot. Thus the two cams are neutralized and there is no opening of the valve at this neutral position.

In Fig. 7a the matter of significance relates to the exhaust valve. It will be noted that here the variable cam at this position controls the point of release and the lift on the cam is about to operate on the roller to open the exhaust valve. A point of release as early as this in the action of the valve would, of course, be ordinarily impractical but by the time there is an effective point of cut-off of the inlet valve the variable cam has been shifted to retard the point of cut-off. It has also retarded the release position to a satisfactory point. The recognition of this possibility is one of the important features of my invention.

In Fig. 8a it will be noted that both the high surfaces of the cams are operating on the rollers simultaneously, thus giving to the valve its maximum lift. There is, therefore, in each of the exhaust movements of the valve in most positions a stepped lifting of the valve.

In Fig. 9a I have shown the compression point, or closing point of the exhaust valve. This is controlled in the early points of cut-off by the fixed cam and the significant point here in relation to the position shown in Fig. 7a is that the release and compression points are at the same point on the stroke with the valve gear at neutral. This is desirable in that from the valve gear in neutral these points are advanced, or retarded, starting from exactly the same point in either direction.

In Fig. 10 I have projected on the diagram the various critical points in the operation of the valves showing the cylinder fluid pressures in the usual manner.

In the diagrams from Fig. 11 to Fig. 16, I have shown a valve gear at an early point of cut-off and with the same critical positions as are used in the series of Figs. 5 to 10.

In Fig. 11, it will be noted, that the variable cam has been moved from that shown in Fig. 5 to retard the cut-off and in Fig. 12 the parts have advanced to the point of cut-off.

In Fig. 13a the exhaust cams are shown at the point of release. Observing the crank position in Fig. 13 it will be noted that this point of release is so retarded as to be in a late part of the stroke as it should be.

The other point of interest is found in Fig. 15a which indicates the compression point which up to this point of cut-off has remained constant at the original point on the stroke being controlled up to this point by the fixed exhaust cam.

In the series of Figs. 17 to 22, I have shown the valve gear set to mid-cut-off. The head and cut-off diagrams indicate a mere advance of the cut-off positions but as to the exhaust cams there is a significant relation established.

In Fig. 19 which is the point of release it will be noted that the variable cam has reached a position corresponding to that of the fixed cam so that the operation on the rollers of the rider is simultaneous by the two cams and the valve is immediately lifted to its wide opening, thus giving an immediate and full exhaust for this late cut-off.

As indicated in Fig. 21a the compression still takes place at the moment the roller rides off the high surface of the fixed cam and the compression, therefore, is still at the original point of the stroke, the various points being clearly indicated by the diagram of Fig. 22.

In Figs. 23 to 27 the valve gear is advanced to late cut-off. It will be noted that the lead point still remains constant, as shown in Fig. 23, this being controlled by the fixed cam and that the two inlet controlling cams are of such length that the valve is retained in its open position throughout practically the entire stroke. It will also be noted that the release point is coincident with the late point of cut-off as indicated in Fig. 24a. The compression point is also indicated in Fig. 26a coincident with the lead point of the inlet valve. This may be observed by comparing Fig. 23a with Fig. 26a, or Fig. 23 with Fig. 26. The point of significance to observe here is that with a further movement of the variable exhaust valve from that shown in Fig. 17a to Fig. 21a the critical action of the cams is reversed and the variable cam controls the compression while the fixed cam controls the release. The point of release, therefore, remains practically at the end of the stroke while the compression point is varied as the cut-off is retarded until at the point of full cut-off, as indicated in this last set of diagrams, the compression point is practically at the end of the stroke and coincident with the lead point. It will be observed, therefore, that this arrangement of the exhaust cams which thus varies their controlling action makes it possible to obtain this ideal condition without lost motion devices and with the exhaust and inlet cams hooked up by direct connections and that exactly the same controlling shafts which may be handled to give the ideal distribution through the inlet cams also may be utilized to give the ideal cam arrangement for the control of the exhaust and the reversing is accomplished merely by changing the fixed and variable cams.

What I claim as new is:—

1. In a valve gear, the combination of an engine exhaust valve; two cams, one of which is adjustable; a rider on said cams responsive to their combined action; a connection between the rider and the valve; and means driven by the engine driving the cams, said cams being timed to make the release and compression points identical with the gear at neutral.

2. In a valve gear, the combination of an engine valve; two cams, one of which is adjustable; a rider on said cams responsive to the combined action of said cams; a connection between the rider and the valve; and means driven by the engine driving and timing the cams with the adjustable cam controlling the opening of the valve and the other the closing of the valve at one adjustment of the adjustable cam and the adjustable cam the closing and the other the opening of the valve at another adjustment of the adjustable cam.

3. In a valve gear, the combination of an engine exhaust valve; two cams, one of which is adjustable; a rider on said cams responsive to the combined action of said cams; a connection between the rider and the valve; and means driven by the engine driving and timing the cams with the adjustable cam controlling the opening of the valve and the other the closing of the valve at one adjustment of the adjustable cam and the adjustable cam the closing and the other the opening of the valve at another adjustment of the adjustable cam.

4. In a valve gear, the combination of an engine exhaust valve; two cams, one of which is adjustable; a rider on said cams responsive to the combined action of said cams; a connection betwen the rider and the valve; and means driven by the engine driving and timing the cams with the adjustable cam controlling the point of release and the other cam the point of compression at the early points of cut-off and the adjustable cam controlling the point of compression and the other cam the point of release at the later points of cut-off.

5. In a valve gear, the combination of an engine valve; two cams driven by the engine, one of which is adjustable; a rider on said cams responsive to their combined action; and a connection between the valve and rider, said cams having high and low surfaces opening the valve with the rider on one of either of the high surfaces at different adjustments of the adjustable cam.

6. In a valve gear, the combination of an engine valve; two cams driven by the engine, one of which is adjustable; a rider on said cams responsive to their combined action; and a connection between the valve and rider, said cams having high and low surfaces opening the valve with the rider on one of either of the high surfaces and the high surfaces of both cams acting through part of their movement simultaneously on the rider.

7. In a valve gear, the combination of an engine exhaust valve; two cams driven by the engine, one of which is adjustable; a rider on said cams responsive to their combined action; and a connection between the valve and rider, said cams having high and low surfaces opening the valve with the rider on one of either of the high surfaces at different adjustments of the adjustable cam.

8. In a valve gear, the combination of an engine exhaust valve; two cams driven by the engine, one of which is adjustable; a rider on said cams responsive to their combined action; and a connection between the valve and rider, said cams having high and low surfaces opening the valve with the rider on one of either of the high surfaces at different adjustments of the adjustable cam and the high surfaces of both cams acting through part of their movement simultaneously on the rider.

9. In a valve gear, the combination of an engine valve; two cams driven by the engine, both of which are adjustable, one being adjustable for one direction and the other adjustable for the other direction of movement of the engine; means for adjusting said cams for reversing the engine; a rider on said cams responsive to the combined action of said cams; and a connection between the rider and the valve, the adjustable cam in both directions controlling the opening of the valve and the other the closing of the valve at one adjustment of the adjustable cam and the adjustable cam the closing and the other cam the opening of the valve at another adjustment of the cams.

10. In a valve gear, the combination of an engine exhaust valve; two cams driven by the engine, both of which are adjustable, one being adjustable for one direction and the other adjustable for the other direction of movement of the engine; means for adjusting said cams for reversing the engine; a rider on said cams responsive to the combined action of said cams; and a connection between the rider and the valve, the adjustable cam in both directions controlling the opening of the valve and the other the closing of the valve at one adjustment of the adjustable cam and the adjustable cam the closing and the other cam the opening of the valve at another adjustment of the cams.

11. In a valve gear, the combination of an engine exhaust valve; two cams driven by the engine, both of which are adjustable, one being adjustable for one direction and the other adjustable for the other direction of movement of the engine; means for adjusting said cams for reversing the engine; a rider on said cams responsive to the combined action of said cams; and a connection between the rider and the valve, the adjustable cams in each direction controlling the release and the other cam the compression with the valve gear set for early points of cut-off and the adjustable cam controlling the point of compression and the other cam the point of release with the valve gear set for late points of cut-off.

12. In a valve gear, the combination of an engine exhaust valve; two cams, both of said cams being adjustable one for one direction of the engine and the other for the reverse direction; a rider on said cams responsive to their combined action; a connection between the rider and the valve; means driven by the engine driving the cams said cams being timed to make the release and compression points identical with the valve gear at neutral; and reversing devices varying one or the other of said cams for forward or reverse action on the valve.

13. In a valve gear, the combination of an engine valve; two cams driven by the engine, both of which are adjustable; a rider on said cams responsive to their combined action; a valve connected with the rider, said cams having high and low surfaces and opening the valve with the rider on one of either of the high surfaces with different adjustments of either cam; and reversing devices varying one or the other of said cams for forward or reverse action on the valve.

14. In a valve gear, the combination of an engine exhaust valve; two cams driven by the engine, both of which are adjustable; a rider on said cams responsive to their combined action; a valve connected with the rider, said cams having high and low surfaces and opening the valve with the rider on one of either of the high surfaces with different adjustments of either cam; and reversing devices varying one or the other of said cams for forward or reverse action on the valve.

15. In a valve gear, the combination of an engine exhaust valve; an engine inlet valve; two exhaust controlling cams driven by the engine; a rider on said cams responsive to the combined action of the cams; a connection between the rider and the exhaust valve; two inlet controlling cams driven by the engine; means connecting said cams in pairs, each pair comprising an inlet controlling cam and a connected exhaust controlling cam; a rider on the inlet controlling cams and responsive to their combined action; and a connection between the last named rider and the inlet valve.

16. In a valve gear, the combination of an engine exhaust valve; an engine inlet valve; two exhaust controlling cams driven by the engine; a rider on said cams responsive to the combined action of the cams; a connection between the rider and the exhaust valve; two inlet controlling cams driven by the engine; means connecting said cams in pairs, each pair comprising an inlet controlling cam and a fixedly connected exhaust controlling cam; a rider on the inlet controlling cams and responsive to their combined action; and a connection between the last-named rider and the inlet valve.

17. In a valve gear, the combination of an engine exhaust valve; an engine inlet valve; two exhaust controlling cams driven by the engine, one of which is adjustable; a rider on said cams responsive to the combined action of the cams; a connection between the rider and the exhaust valve; two inlet controlling valves driven by the engine, one of which is adjustable; means connecting said cams in pairs, the adjustable cams being in one pair and the remaining cams in the other pair; a rider on the inlet controlling cams and responsive to their combined action; and a connection between the last-named rider and the inlet valve.

18. In a valve gear, the combination of an engine exhaust valve; an engine inlet valve; two exhaust controlling cams driven by the engine, one of which is adjustable; a rider on said cams responsive to the combined action of the cams; a connection between the rider and the exhaust valve; two inlet controlling cams driven by the engine, one of which is adjustable; means connecting said cams in pairs, the adjustable cams being in one pair and the remaining cams in the other pair; a rider on the inlet controlling cams and responsive to their combined action; and a connection between the last-named rider and the inlet valve.

19. In a valve gear, the combination of an engine exhaust valve; an engine inlet valve; two exhaust controlling cams driven by the engine; a rider on said cams responsive to the combined action of the cams; a connection between the rider and the exhaust valve; two inlet controlling cams driven by the engine; a rider on the inlet controlling cams responsive to their combined action; a connection between the last-named rider and the inlet valve; means connecting said cams in pairs, each pair comprising an inlet controlling cam and an exhaust controlling cam; and means driven by the engine driving said cams, said cams being timed to make the release and compression points of the exhaust valve identical with the valve gear at neutral.

20. In a valve gear, the combination of an engine exhaust valve; an engine inlet valve; two exhaust controlling cams driven by the engine, one of which is adjustable; a rider on said cams responsive to the combined action of the cams; a connection between the rider and the exhaust valve; two inlet controlling cams driven by the engine, one of which is adjustable; means connecting said cams in pairs, each pair comprising an inlet controlling cam and an exhaust controlling cam; a rider on the inlet controlling cams and responsive to their combined action; and a connection between the last-named rider and the inlet valve, the adjustable cam controlling the opening of the exhaust valve and the other exhaust valve controlling cam controlling the closing of the exhaust valve at one adjustment of the adjustable exhaust controlling cam and the adjustable exhaust controlling cam the closing and the other exhaust controlling cam the opening of the valve at another adjustment of the adjustable exhaust controlling cam.

21. In a valve gear, the combination of an engine exhaust valve; two exhaust valve controlling cams driven by the engine, one of which is adjustable; a rider on said cams responsive to the combined action of said cams; a connection between the rider and the valve, the adjustable cam controlling the point of release and the other cam the point of compression at the early points of cut-off and the adjustable cam controlling the point of compression and the other cam the point of release at the later points of cut-off; an inlet valve; two inlet valve controlling cams; a rider on said cams; and a connection between the rider and the inlet valve, an exhaust valve controlling cam being connected with an inlet controlling cam.

22. In a valve gear, the combination of an engine exhaust valve; two exhaust valve controlling cams driven by the engine, one of which is adjustable; a rider on said cams responsive to their combined action; a connection between the valve and rider, said cams having high and low surfaces opening the valve with the rider on one or the other of the high surfaces; an inlet valve; two inlet valve controlling cams driven by the engine, one of which is adjustable; means connecting said cams in pairs, each pair comprising an inlet controlling and exhaust controlling cam; a rider on said inlet valve controlling cams; and a connection between the rider and the inlet valve, said inlet valve controlling cams having high and low surfaces opening the inlet valve only when the rider is on both high surfaces.

23. In a valve gear, the combination of an engine exhaust valve; two exhaust valve controlling cams driven by the engine, one of which is fixed and the other adjustable; a rider on said cams responsive to their combined action; a connection between the valve and rider, the fixed cam controlling the compression point at early cut-off and the adjustable cam the release and the fixed cam controlling the point of release at late cut-off and the adjustable cam the compression; an inlet valve; two inlet valve controlling cams driven by the engine in timed relation with the exhaust valve controlling cams, one of said inlet controlling valve cams being fixed relatively to the lead point and the other of said inlet controlling valve cams being adjustable, the fixed inlet controlling valve cam controlling the lead and the adjustable inlet controlling valve cam controlling the cut-off; a rider on said inlet valve controlling cams; and a connection between the rider and said inlet valve.

24. In a valve gear, the combination of an engine exhaust valve; two exhaust valve controlling cams driven by the engine, one of which is fixed and the other adjustable; a rider on said cams responsive to their combined action; a connection between the valve and rider, the fixed cam controlling the compression point at early cut-off and the adjustable cam the release and the fixed cam controlling the point of release at late cut-off and the adjustable cam the compression; an inlet valve; two inlet valve controlling cams driven by the engine, one of said inlet controlling valve cams being fixed relatively to the lead point and the other of said inlet controlling valve cams being adjustable, the fixed inlet controlling valve cam controlling the lead and the adjustable inlet controlling valve cam controlling the cut-off, said inlet controlling cams being connected with the exhaust valve controlling cams; a rider on said inlet valve controlling cams; and a connection between the rider and said inlet valve.

25. In a valve gear, the combination of an engine exhaust valve; two exhaust valve controlling cams driven by the engine, one of which is fixed and the other adjustable; a rider on said cams responsive to their combined action; a connection between the valve and rider, the fixed cam controlling the compression point at early cut-off and the adjustable cam the release and the fixed cam controlling the point of release at late cut-off and the adjustable cam the compression; an inlet valve; two inlet valve controlling cams driven by the engine, one of said inlet valve controlling cams being fixed relatively to the lead point and the other of said inlet valve controlling cams being adjustable, the fixed inlet controlling valve cam controlling the lead and the adjustable inlet controlling valve cam controlling the cut-off; a rider on said inlet valve controlling cams; and a connection between the rider and said inlet valve, said fixed inlet valve controlling cam being in fixed connection with the fixed exhaust valve controlling cam and the adjustable inlet controlling cam being in fixed connection with the adjustable exhaust valve controlling cam.

26. In a valve gear, the combination of an engine exhaust valve; two exhaust valve controlling cams driven by the engine, both of said cams being adjustable, one for forward direction of the engine and the other for the reverse direction; a rider on said cams responsive to their combined action; a connection between the rider and the valve; an inlet valve; two inlet controlling valve cams driven by the engine in timed relation with the exhaust valve controlling cams, both of said cams being adjustable, one for a forward direction of the engine and the other for the reverse direction; a rider on said inlet controlling valve cams responsive to their combined action; a connection between said last-mentioned rider and the inlet valve; and common reversing devices varying one or the other of said inlet and exhaust controlling cams for forward or reverse actions of the valves.

27. In a valve gear, the combination of an engine exhaust valve; two exhaust valve controlling cams driven by the engine, both of said cams being adjustable, one for forward direction of the engine and the other for the reverse direction; a rider on said cams responsive to their combined action; a connection between the rider and the valve; an inlet valve; two inlet controlling valve cams driven by the engine, both of said cams being adjustable, one for a forward direction of the engine and the other for the reverse direction; a rider on said inlet controlling valve cams responsive to their combined action; a connection between said last-mentioned rider and the inlet valve; and reversing devices varying one or the other of said inlet and exhaust controlling cams for forward or reverse actions of the valves, an exhaust valve controlling cam being connected with each inlet controlling cam.

28. In a valve gear, the combination of an engine exhaust valve; two exhaust valve controlling cams driven by the engine, both of said cams being adjustable, one for forward direction of the engine and the other for reverse direction; a rider on said cams responsive to their combined action; a connection between the rider and the valve; an inlet valve; two inlet controlling valve cams driven by the engine, both of said cams being adjustable, one for a forward direction of the engine and the other for the reverse direction; a rider on said inlet controlling valve cams responsive to their combined action; a connection between said last-mentioned rider and the inlet valve; and reversing devices varying one or the other of said inlet and exhaust controlling cams for forward or reverse actions of the valves, an exhaust valve controlling cam being fixedly connected with each inlet controlling cam.

29. In a valve gear, the combination of an engine exhaust valve; two exhaust valve controlling cams driven by the engine, both of which are adjustable, one being adjustable for forward direction and the other adjustable for reverse direction; a rider on said cams responsive to the combined action of said cams; a connection between the rider and the exhaust valve, the adjustable cam for each direction controlling the opening of the valve and the other the closing of the valve at one adjustment of the adjustable cam and the adjustable cam the closing and the other cam the opening of the valve at another adjustment of the cam; an inlet valve; two inlet valve controlling cams, both of which are adjustable, one being adjustable for forward movement and the other adjustable for a reverse movement; a driving connection between said inlet valve controlling cams and the engine driving said cams in timed relation with the exhaust valve controlling cams, a rider on said inlet valve controlling cams; a connection between the last-named rider and the valve; and reversing devices operating on the adjustable cams for forward or reverse actions.

30. In a valve gear, the combination of an engine exhaust valve; two exhaust valve controlling cams driven by the engine, both of which are adjustable, one being adjustable for forward direction and the other adjustable for reverse direction; a rider on said cams responsive to the combined action of said cams; a connection between the rider and the exhaust valve, the adjustable cam for each direction controlling the opening of the valve and the other the closing of the valve at one adjustment of the adjustable cam and the adjustable cam the closing and the other cam the opening of the valve at another adjustment of the cam; an inlet valve; two inlet valve controlling cams, both of which are adjustable, one being adjustable for forward movement and the other adjustable for a reverse movement; a rider on said inlet valve controlling cams; a connection between the last-named rider and the valve; and reversing devices operating on the adjustable cams for forward or reverse actions, an exhaust valve controlling cam being connected with each inlet controlling cam.

31. In a valve gear, the combination of an engine exhaust valve; two exhaust valve controllling cams driven by the engine, both of which are adjustable, one being adjustable for a forward motion and the other adjustable for reverse; a rider on said cams responsive to the combined action of the cams; a connection between the rider and the cams, the adjustable cam in each direction controlling the release and the other cam the compression with the valve gear set at early points of cut-off and the adjustable cam controlling the point of compression and the other cam the point of release with the valve gear set at late points of cut-off; an inlet valve; two inlet valve controlling cams, both of which are adjustable, one being adjustable for forward motion and the other for reverse, the adjustable inlet cam controlling the point of cut-off and the other inlet valve controlling cam controlling the lead; a driving connection between said inlet valve controlling cams and the engine driving said cams in timed relation with the exhaust valve controlling cams and reversing devices varying one or the other of the exhaust valve controlling cams and inlet valve controlling cams for forward or reverse action on the valve.

32. In a valve gear, the combination of an engine exhaust valve; two exhaust valve controlling cams driven by the engine, both of which are adjustable, one being adjustable for a forward motion and the other adjustable for reverse; a rider on said cams responsive to the combined action of the cams; a connection between the rider and the cams, the adjustable cam in each direction controlling the release and the other cam the compression with the valve gear set at early points of cut-off and the adjustable cam controlling the point of compression and the other cam the point of release with the valve gear set at late points of cut-off; an inlet valve; two inlet valve controlling cams, both of which are adjustable, one being adjustable for forward motion and the other for reverse, the adjustable inlet cam controlling the point of cut-off and the other inlet valve controlling cam controlling the lead; and reversing devices varying one or the other of the exhaust valve controlling cams and inlet valve controlling cams for forward or reverse action on the valve, an exhaust valve controlling cam being connected with each inlet controlling cam.

33. In a valve gear, the combination of an engine exhaust valve; two exhaust valve controlling cams driven by the engine, both of which are adjustable, one being adjustable for a forward motion and the other adjustable for reverse; a rider on said cams responsive to the combined action of the cams; a connection between the rider and the cams, the adjustable cam in each direction controlling the release and the other cam the compression with the valve gear set at early points of cut-off and the adjustable cam controlling the point of compression and the other cam the point of release with the valve gear set at late points of cut-off; an inlet valve; two inlet valve controlling cams, both of which are adjustable, one being adjustable for forward motion and the other for reverse, the adjustable inlet cam controlling the point of cut-off and the other inlet valve controlling cam controlling the lead; and reversing devices varying one or the other of the exhaust valve controlling cams and inlet valve controlling cams for forward or reverse action on the valve, an exhaust valve controlling cam being fixedly connected with each inlet controlling cam.

34. In a valve gear, the combination of an engine exhaust valve; two exhaust valve controlling cams driven by the engine, both of said cams being adjustable, one for one direction of the engine and the other for the reverse direction; a rider on said cams responsive to their combined action; a connection between the rider and the valve, the cams being timed to make the release and compression points identical with the valve gear at neutral; an inlet valve; two inlet valve controlling cams, both of which are adjustable, one being adjustable for forward movement and the other being adjustable for reverse, the adjustable inlet valve controlling cam controlling the point of cut-off and the other inlet valve controlling cam controlling the lead; a driving connection between said inlet valve controlling cams and the engine driving said cams in timed relation with the exhaust valve controlling cams and reversing devices varying one or the other of said exhaust valve controlling cams and the inlet controlling cams for forward or reverse action on the valve.

35. In a valve gear, the combination of an engine exhaust valve; two exhaust valve controlling cams driven by the engine, both of said cams being adjustable, one for one direction of the engine and the other for the reverse direction; a rider on said cams responsive to their combined action; a connection between the rider and the valve, the cams being timed to make the release and compression points identical with the valve gear at neutral; an inlet valve; two inlet valve controlling cams, both of which are adjustable, one being adjustable for forward movement and the other being adjustable for reverse, the adjustable inlet valve controlling cam controlling the point of cut-off and the other inlet valve controlling cam controlling the lead; and reversing devices varying one or the other of said exhaust valve controlling cams and inlet controlling cams for forward or reverse action on the valve, an exhaust valve controlling cam being connected with each inlet valve controlling cam.

36. In a valve gear, the combination of an engine exhaust valve; two exhaust valve controlling cams driven by the engine, both of said cams being adjustable, one for one direction of the engine and the other for the reverse direction; a rider on said cams responsive to their combined action; a connection between the rider and the valve, the cams being timed to make the release and compression points identical with the valve gear at neutral; an inlet valve; two inlet valve controlling cams, both of which are adjustable, one being adjustable for forward movement and the other being adjustable for reverse, the adjustable inlet valve controlling cam controlling the point of cut-off and the other inlet valve controlling cam controlling the lead; and reversing devices varying one or the other of said exhaust valve controlling cams and inlet controlling cams for forward or reverse action on the valve, an exhaust valve controlling cam being fixedly connected with each inlet valve controlling cam.

37. In a valve gear, the combination of an engine exhaust valve; two exhaust valve controlling cams driven by the engine, both of which are adjustable, one being adjustable for forward movement and the other adjustable for reverse; a rider on said cams responsive to their combined action; a connection between the rider and the exhaust valve, said cams having high and low surfaces and opening the valve with the rider on one of either of the high surfaces; an inlet valve; two inlet valve controlling cams, both of which are adjustable, one being adjustable for forward movement and the other for reverse; a driving connection between said inlet valve controlling cams and the engine driving said cams in timed relation with the exhaust valve controlling cams and reversing devices varying one or the other of said exhaust valve controlling cams and one or the other of the inlet valve controlling cams for forward or reverse action on the valve.

38. In a valve gear, the combination of an engine exhaust valve; two exhaust valve controlling cams driven by the engine, both of which are adjustable, one being adjustable for forward movement and the other adjustable for reverse; a rider or said cams responsive to their combined action; a connection between the rider and the exhaust valve, said cams having high and low surfaces and opening the valve with the rider on one of either of the high surfaces; an inlet valve; two inlet valve controlling cams, both of which are adjustable, one being adjustable for forward movement and the other for reverse; a driving connection between said inlet valve controlling cams and the engine driving said cams in timed relation with the exhaust valve controlling cams and reversing devices varying one or the other of said exhaust valve controlling cams and one or the other of the inlet valve controlling cams for forward or reverse action on the valve, said inlet valve controlling cams having high and low surfaces and opening the valve only with the rider on both high surfaces.

39. In a valve gear, the combination of an engine exhaust valve; two exhaust valve controlling cams driven by the engine, one of which is adjustable, said cams having their axes spaced apart; a rider on said cams responsive to the combined action of said cams; a connection between the rider and the valve, the adjustable cam controlling the point of release and the other cam the point of compression at the early points of cut-off and the adjustable cam controlling the point of compression and the other cam the point of release at the later points of cut-off; an inlet valve; two inlet valve controlling cams, said cams having their axes in alinement with the axes of the exhaust valve controlling cams; a rider on said cams; and a connection between the rider and the inlet valve, an exhaust valve controlling cam being connected with each inlet controlling cam.

40. In a valve gear, the combination of an engine exhaust valve; two exhaust valve controlling cams driven by the engine, one of which is adjustable; a rider on said cams responsive to the combined action of said cams; a connection between the rider and the valve, the adjustable cam controlling the point of release and the other cam the point of compression at the early points of cut-off and the adjustable cam controlling the point of compression and the other cam the point of release at the later points of cut-off; an inlet valve; two inlet valve controlling cams; a rider on said cams; and a connection between the rider and the inlet valve, said cams having their axes spaced apart, an exhaust valve controlling cam being fixedly connected with each inlet controlling cam.

41. In a valve gear, the combination of an engine exhaust valve; two exhaust valve controlling cams driven by the engine, one of which is adjustable; a rider on said cams responsive to their combined action; a connection between the valve and rider, said cams having high and low surfaces opening the valve with the rider on one or the other of the high surfaces; an inlet valve; two inlet valve controlling cams driven by the engine, one of which is adjustable; a rider on said inlet valve controlling cams; and a connection between the rider and the inlet valve, said inlet valve controlling cams having high and low surfaces opening the inlet valve when the rider is on both high surfaces, said exhaust valve controlling cams and inlet valve controlling cams being arranged with their axes spaced apart, an exhaust valve controlling cam being connected with each inlet controlling cam.

42. In a valve gear, the combination of an engine exhaust valve; two exhaust valve controlling cams driven by the engine, one of which is fixed and the other adjustable; a rider on said cams responsive to their combined action; a connection between the valve and rider, the fixed cam controlling the compression point at early cut-off and the adjustable cam the release and the fixed cam controlling the point of release at late cut-off and the adjustable cam the compression; an inlet valve; two inlet valve controlling cams driven by the engine, one of said inlet valve controlling cams being fixed relatively to the lead point and the other of said inlet controlling valve cams being adjustable, the fixed inlet controlling valve cam controlling the lead and the adjustable inlet valve controlling cam controlling the cut-off, said inlet controlling cams being connected with the exhaust valve controlling cams, in pairs, each pair comprising an exhaust valve controlling cam and an inlet valve controlling cam, the axes of said pairs being spaced apart; a rider on said inlet valve controlling cams; and a connection between the rider and said inlet valve.

43. In a valve gear, the combination of an engine exhaust valve; two exhaust valve controlling cams driven by the engine, both of said cams being adjustable, one for forward direction of the engine and the other for the reverse direction; a rider on said cams responsive to their combined action; a connection between the rider and the valve; an inlet valve; two inlet valve controlling cams driven by the engine, both of said cams being adjustable, one for a forward direction of the engine and the other for the reverse direction; a rider on said inlet valve controlling cams responsive to their combined action; a connection between said last-mentioned rider and the inlet valve; and reversing devices varying one or the other of said inlet and exhaust controlling cams for forward or reverse actions of the valves, an exhaust valve controlling cam being connected with each inlet controlling cam, the axes of the exhaust valve controlling cams and the inlet valve controlling cams being spaced apart.

44. In a valve gear, the combination of an engine exhaust valve; two exhaust valve controlling cams driven by the engine, both of which are adjustable, one being adjustable for forward direction and the other adjustable for reverse direction; a rider on said cams responsive to the combined action of said cams; a connection between the rider and the exhaust valve, the adjustable cam for each direction controlling the opening of the valve and the other the closing of the valve at one adjustment of the adjustable cam and the adjustable cam the closing and the other cam the opening of the valve at another adjustment of the cam; an inlet valve; two inlet valve controlling cams, both of which are adjustable, one being adjustable for forward movement and the other adjustable for a reverse movement; a rider on said inlet valve controlling cams; a connection between the last-named rider and the valve; and reversing devices operating on the adjustable cams for forward or reverse actions, said cams being arranged in pairs, each pair comprising an exhaust valve controlling cam and a connected inlet controlling cam, the axes of said pairs being spaced apart.

45. In a valve gear, the combination of an engine exhaust valve; two exhaust valve controlling cams driven by the engine, both of which are adjustable, one being adjustable for a forward motion and the other adjustable for reverse; a rider on said cams responsive to the combined action of the cams; a connection between the rider and the cams, the adjustable cam in each direction controlling the release and the other cam the compression with the valve gear set at early points of cut-off and the adjustable cam controlling the point of compression and the other cam the point of release with the valve gear set at late points of cut-off; an inlet valve; two inlet valve controlling cams, both of which are adjustable, one being adjustable for forward motion and the other for reverse, the adjustable inlet cam controlling the point of cut-off and the other inlet valve controlling cam controlling the lead; and reversing devices varying one or the other of the exhaust valve controlling cams and inlet valve controlling cams for forward or reverse action on the valve, said cams being arranged in pairs, each pair comprising an exhaust valve controlling cam and a connected inlet controlling cam, the axes of said pairs being spaced apart.

46. In a valve gear, the combination of an engine exhaust valve; two exhaust valve controlling cams driven by the engine, both of said cams being adjustable, one for one direction of the engine and the other for the reverse direction; a rider on said cams responsive to their combined action; a connection between the rider and the valve; means driven by the engine driving the cams, said cams being timed to make the release and compression points identical with the valve gear at neutral; an inlet valve; two inlet valve controlling cams, both of which are adjustable, one being adjustable for forward movement and the other being adjustable for reverse, the adjustable inlet valve controlling cam controlling the point of cut-off and the other inlet valve controlling cam controlling the lead; and reversing devices varying one or the other of said exhaust valve controlling cams and inlet controlling cams for forward or reverse action on the valve, said cams being arranged in pairs, each pair comprising an exhaust valve controlling cam and a fixedly connected inlet valve controlling cam, the axes of said pairs being spaced apart.

47. In a valve gear, the combination of an engine exhaust valve; two exhaust valve controlling cams driven by the engine, both of which are adjustable, one being adjustable for forward movement and the other adjustable for reverse; a rider on said cams responsive to their combined action; a connection between the rider and the exhaust valve, said cams having high and low surfaces and opening the valve with the rider on one of either of the high surfaces with different adjustments of either cam; an inlet valve; two inlet valve controlling cams, both of which are adjustable, one being adjustable for forward movement and the other for reverse; and reversing devices varying one or the other of said exhaust valve controlling cams and of the inlet valve controlling cams for forward or reverse action on the valve, said inlet valve controlling cams having high and low surfaces and opening the valve only with the rider on both high surfaces, an exhaust valve controlling cam being connected with an inlet valve controlling cam, said exhaust valve controlling cams and inlet controlling cams having their axes spaced apart.

48. In a valve gear, the combination of two valve actuating cams; a rider on said cams responsive to their combined action; a connection between the rider and the valve; driven spiral gears actuating said cams; a cross shaft; driving spiral gears on said cross shaft, said driving spiral gears being locked against rotation on the cross shaft; a movable axle thereon; and means moving either of the spiral gears to advance one or the other of the cams for forward, or reverse movement.

49. In a valve gear, the combination of an engine exhaust valve; an engine inlet valve; a pair of cams for each valve, the cams of each pair having spaced axes; a rider for each pair of cams responsive to the combined action of the cams of said pair; connections between the riders and the valves; and means driven by the engine driving said cams in timed relation.

HERMAN G. MUELLER.